(12) United States Patent
Stamate et al.

(10) Patent No.: US 9,241,155 B2
(45) Date of Patent: Jan. 19, 2016

(54) 3-D RENDERING FOR A ROTATED VIEWER

(75) Inventors: Vlad Stamate, Hayward, CA (US);
Steven Osman, San Francisco, CA (US)

(73) Assignee: SONY COMPUTER ENTERTAINMENT INC., Tokyo (JP)

( * ) Notice: Subject to any disclaimer, the term of this patent is extended or adjusted under 35 U.S.C. 154(b) by 811 days.

(21) Appl. No.: 13/214,918

(22) Filed: Aug. 22, 2011

(65) Prior Publication Data
US 2012/0038635 A1 Feb. 16, 2012

Related U.S. Application Data

(63) Continuation of application No. PCT/US2010/045078, filed on Aug. 10, 2010.

(51) Int. Cl.
H04N 9/47 (2006.01)
G06T 15/00 (2011.01)
H04N 13/04 (2006.01)
H04N 13/02 (2006.01)

(52) U.S. Cl.
CPC ....... *H04N 13/0477* (2013.01); *H04N 13/0278* (2013.01); *H04N 13/0479* (2013.01)

(58) Field of Classification Search
None
See application file for complete search history.

(56) References Cited

U.S. PATENT DOCUMENTS

| | | | |
|---|---|---|---|
| 4,807,202 A * | 2/1989 | Cherri | G09B 9/05 367/129 |
| 4,884,876 A | 12/1989 | Lipton et al. | |
| 4,907,860 A | 3/1990 | Noble | |
| 5,805,205 A | 9/1998 | Songer | |
| 5,821,989 A | 10/1998 | Lazzaro et al. | |
| 6,175,379 B1 * | 1/2001 | Uomori | H04N 13/0278 345/419 |
| 6,198,484 B1 * | 3/2001 | Kameyama | G06T 15/10 345/419 |
| 6,727,867 B2 | 4/2004 | Divelbiss et al. | |
| 8,269,822 B2 * | 9/2012 | Zalewski | A63F 13/00 348/56 |
| 8,605,140 B2 | 12/2013 | Chiba et al. | |
| 2002/0122145 A1 | 9/2002 | Tung | |
| 2002/0149613 A1 * | 10/2002 | Gutta | G06F 3/011 715/728 |
| 2005/0024586 A1 | 2/2005 | Teiwes et al. | |
| 2005/0057807 A1 * | 3/2005 | Takagi | H04N 13/0404 359/462 |
| 2005/0094267 A1 * | 5/2005 | Huber | G02B 27/26 359/464 |
| 2005/0116881 A1 | 6/2005 | Divelbiss et al. | |
| 2005/0259323 A1 | 11/2005 | Fukushima et al. | |
| 2006/0038880 A1 | 2/2006 | Starkweather et al. | |

(Continued)

FOREIGN PATENT DOCUMENTS

| | | |
|---|---|---|
| CN | 1749808 A | 3/2006 |
| CN | 101840073 A | 9/2010 |

(Continued)

OTHER PUBLICATIONS

Toner, Mark, *Dissertation abstract*, 2 pages, Jul. 2010.

*Primary Examiner* — Christopher S Kelley
*Assistant Examiner* — Kaitlin A Retallick
(74) *Attorney, Agent, or Firm* — Kilpatrick Townsend & Stockton LLP

(57) ABSTRACT

Methods and systems for displaying a three dimensional image to a rotated viewer are presented. The roll and yaw of a viewer's eyes, with respect to a display, is tracked and used to adjust the orientation of a pair of stereoscopic images so as to maintain a three dimensional image when a viewer is rotated. Adjustment to the orientation of the pair of stereoscopic images may also factor in the orientation of a plurality of viewers, each viewer with a potentially different orientation with respect to the display.

27 Claims, 13 Drawing Sheets

(56) References Cited

U.S. PATENT DOCUMENTS

| | | | |
|---|---|---|---|
| 2006/0061652 A1* | 3/2006 | Sato | H04N 13/0429 348/53 |
| 2007/0236493 A1 | 10/2007 | Horiuchi et al. | |
| 2008/0062259 A1 | 3/2008 | Lipton et al. | |
| 2008/0084513 A1 | 4/2008 | Brott et al. | |
| 2008/0100547 A1* | 5/2008 | Cernasov | G02B 27/2214 345/87 |
| 2010/0007582 A1 | 1/2010 | Zalewski | |
| 2010/0171697 A1* | 7/2010 | Son | H04N 13/0278 345/158 |
| 2010/0177174 A1 | 7/2010 | Ko et al. | |
| 2010/0238097 A1 | 9/2010 | Baik et al. | |
| 2011/0032365 A1* | 2/2011 | Yett | G02B 27/2235 348/207.1 |
| 2011/0149054 A1* | 6/2011 | Yun | G02B 27/26 348/58 |
| 2011/0216175 A1 | 9/2011 | Shimoyama et al. | |
| 2011/0234774 A1 | 9/2011 | Satoh et al. | |
| 2013/0002839 A1 | 1/2013 | Pennisi et al. | |

FOREIGN PATENT DOCUMENTS

| | | |
|---|---|---|
| CN | 101995669 A | 3/2011 |
| DE | 19533767 A1 | 3/1997 |
| JP | 9135400 A | 5/1997 |
| WO | WO 0215595 A1 * | 2/2002 |
| WO | 2011/083435 A1 | 7/2011 |
| WO | 2012/021129 A1 | 2/2012 |

* cited by examiner

3-D RENDERING FOR A ROTATED VIEWER

CROSS-REFERENCES TO RELATED APPLICATIONS

This application is a continuation of International Application No. PCT/US2010/045078, filed Aug. 10, 2010, which is hereby incorporated by reference in its entirety for all purposes.

BACKGROUND

1. Field of the Invention

Embodiments of the present invention relate to three dimensional image rendering and three dimensional image display in general and, in particular, to the rendering and display of stereoscopic images at various distances and degrees of roll to compensate for a viewer whose eyes are rotated with respect to a display. Further embodiments are directed to determining the degree of roll with which to display stereoscopic images when viewed by a plurality of viewers, where each viewer's eyes may have a different roll inclination with respect to the display.

2. Description of the Related Art

Three dimensional images are typically displayed to viewers through the process of stereoscopy, where a different perspective of an object or scene is presented to each eye of the viewer. This pair of stereoscopic images is seen by the eyes and combined in vision processing to create the illusion of depth. The general idea can be captured by the example of three dimensional glasses with red and blue lenses, where each lens filters out a respective color to present a different image to each eye, which results in the display of a three dimensional image. Autostereoscopic techniques exist to present different images to each eye without the use of glasses.

In prior art implementations, a pair of stereoscopic images displayed to the viewer are presented such that the images as viewed are horizontally adjacent and horizontally separated so as to create an illusion of depth when combined. This horizontal orientation of the images assumes that a viewer is facing the display without any degree of roll in the viewer's eyes with respect to the display, such as if a viewer were laying on their side. The horizontal spacing of the pair of stereoscopic images also remains constant, even if there is yaw rotation of the viewer's eyes.

BRIEF SUMMARY

There may be a need in the art to rotate the pair of stereoscopic images in order to display a proper three dimensional image to the viewer when the viewer's eyes are rotated in terms of roll and to decrease the distance between the stereoscopic images when the user's eyes are rotated in terms of yaw, with respect to the display. There also may be a need to determine the degree and magnitude of stereoscopic adjustment and the parties the stereoscopic images should be displayed to when there is more than one viewer.

Methods and systems are presented for displaying a three dimensional image. In an example embodiment, the orientation of a viewer's eyes with respect to a display, comprising a roll inclination, is received, image data is received, a pair of stereoscopic images are rendered using the image data, and the stereoscopic images are displayed on the display to the viewer at substantially the same roll as the viewer's eyes, thereby compensating for the roll of the viewer's eyes with respect to the display.

In further embodiments, the received orientation may include a yaw inclination and the distance between the stereoscopic images may be multiplied by the cosine or other function of the yaw inclination, thereby compensating for the yaw of the viewer's eyes with respect to the display.

Some embodiments pertain to stereoscopic images that are rotated to the degree of the roll of the viewer's eyes and further embodiments are directed to stereoscopic images that are dynamic, such as motion picture movies, video games, and broadcast television.

In some embodiments, a method to display a three dimensional image receives orientation data on a plurality of viewers' eyes with respect to a display, the orientation data comprising a plurality of roll inclinations, receiving image data, rendering a pair of stereoscopic images from the image data, and displaying the pair of stereoscopic images on the display to the viewer at a roll inclination derived from the plurality of roll inclinations.

Other embodiments relate to displaying the stereoscopic images to a plurality of viewers based on the average of the viewers' roll inclination. In other embodiments the stereoscopic images are displayed based on a weighted average of the viewers' roll inclinations, where greater weight is assigned to viewer closer to the display or closer to a remote that controls the display. In an example embodiment, the stereoscopic image is displayed based on a subset of the viewers' roll inclinations and the stereoscopic images are only displayed to the viewers associated with the subset of roll inclinations.

Other embodiments relate to displaying the stereoscopic images to a plurality of viewers at a plurality of roll inclinations using a parallax barrier grid or lenticular elements.

Some embodiments include a system for displaying three dimensional images, comprising a means for receiving an orientation of a viewer's eyes with respect to a display, the orientation comprising a roll inclination, means for receiving image data to be displayed on the display, a three dimensional rendering device to render a pair of stereoscopic images from the image data, and the display to display the pair of stereoscopic eyes at substantially the same roll inclination as the viewer's eyes.

Some embodiments relate to machine-readable tangible storage media and computer systems that store or execute instructions for the methods described above.

BRIEF DESCRIPTION OF THE DRAWINGS

A further understanding of the nature and advantages of the present invention may be realized by reference to the following drawings. In the appended figures, similar components or features may have the same reference label.

Figure 1:
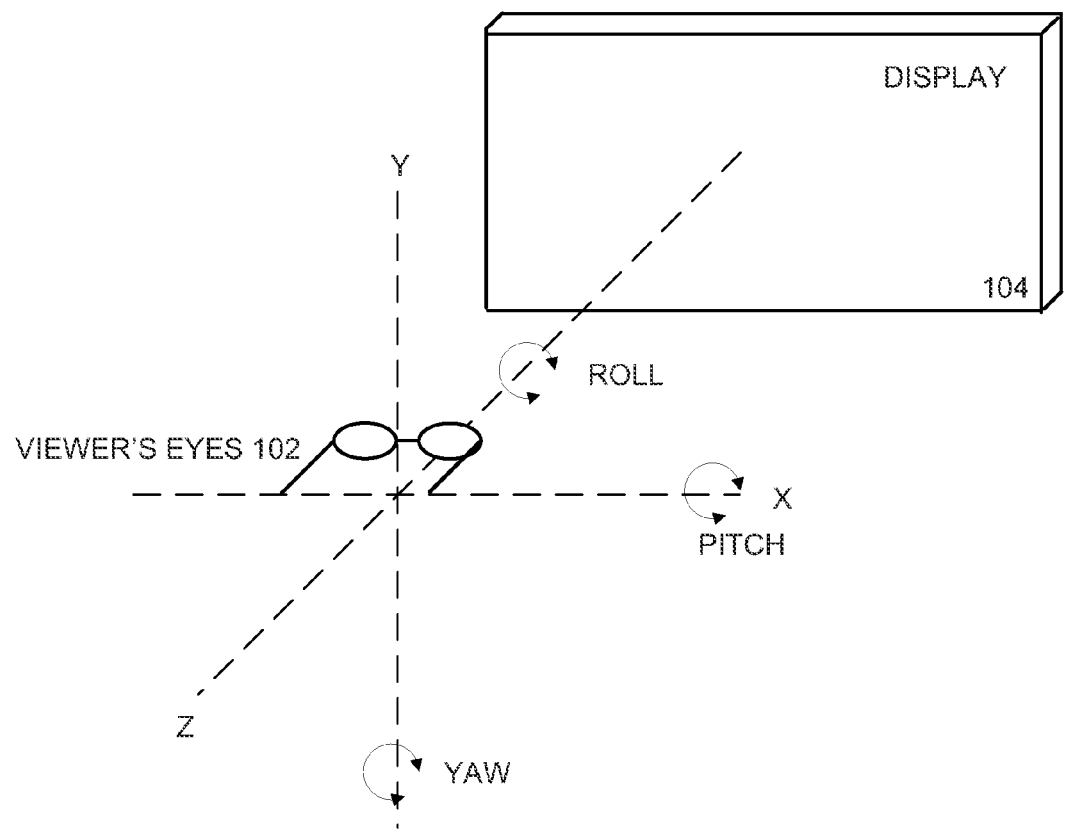
FIG. 1 is a diagram of a viewer's eyes with regard to a display illustrating various dimensions of inclination, according to an example embodiment.

The figures will now be used to illustrate different embodiments in accordance with the invention. The figures are specific examples of embodiments and should not be interpreted as limiting embodiments, but rather exemplary forms and procedures.

DETAILED DESCRIPTION

Methods and systems are presented for three dimensional rendering for a rotated viewer. The eyes of a viewer are tracked in relation to a display, and orientation data, such as yaw, roll, and pitch, distance, and location may be tracked. This information can then be processed to adjust the orientation of a pair of stereoscopic images that are output to the display so as to preserve the three dimensional effects, even when a viewer is rotated, such as when the viewer is laying on his or her side.

To compensate for roll in the viewer's eyes with respect to the display, the stereoscopic images may be rotated in substantially the same inclination as the viewer's eyes. For example, if the viewer rotates his head 10° to the left along the z-axis, then the pair of stereoscopic images may also be rotated 10° to the left. When a viewer rotates their head along the y-axis (yaw), then perspective effect may distort the intended three dimensional image. To compensate for the yaw, the distance between the pair of stereoscopic images may be reduced. Roll and yaw may be analyzed in combination to determine roll and distance adjustments.

Technologies allow for multiple parties to view the same three dimensional image from the display. Methods and systems to present a single pair of stereoscopic images with a roll inclination to a plurality of viewers is described in this document. Such methods to compensate for roll and yaw for a plurality of viewers may include averaging, weighted average by distance, and presenting the mode rotation. Some technologies and methods, such as parallax barrier grids and lenticular technologies may present a plurality of three dimensional images to a plurality of viewers, which may allow for each viewer to be displayed a personalized pair of stereoscopic images with a personalized roll inclination.

The rotation and adjustment of stereoscopic images may work well with dynamically produced images, such as live rendered three dimensional video games. However, other techniques, such as image based rendering, where three dimensional images may be inferred from two dimensional images, may also be rotated and adjusted. In some embodiments, the rotation of the stereoscopic images may not match the exact rotation of the viewer's eyes with respect to the display. For example, some types of image based rendering may interpolate stereoscopic images at certain predefined intervals, such as every 22.5°. In such cases, the techniques described to rotate a pair of stereoscopic images may substantially match the roll of the viewer's eyes with respect to a display, by interpolating the stereoscopic images to the closest available intervals, but may not match the roll exactly.

This description provides examples only and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may be required before, after, or concurrently with the following embodiments.

FIG. 1 is a diagram of a viewer's eyes with respect to a display illustrating various dimensions of inclination, according to an example embodiment. A viewer's eyes 102 are shown directly facing and horizontally aligned with respect to a display 104. The viewer's eyes 102 are drawn as a pair of glasses to illustrate depth, but may represent a pair of unassisted eyes without glasses of other accessories. The x, y, and z-axes represent the dimensions in which the viewer's eyes 102 may be inclined with regards to the display 104. Rotation along the z-axis is roll, rotation around the y-axis is yaw, and rotation along the x-axis is pitch. The terms "rotated" and "inclined," and "rotation" and "inclination" may be used interchangeably.

Figure 2:
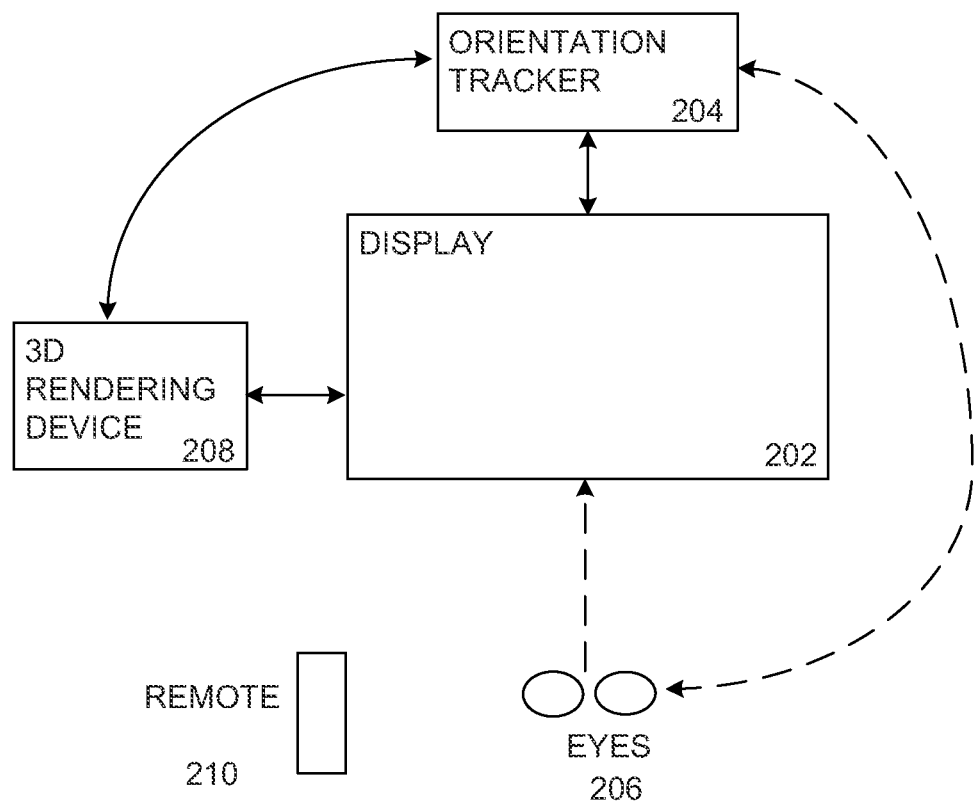
FIG. 2 is a block diagram of a three dimensional display system, according to an example embodiment.

FIG. 2 is a block diagram of a three dimensional display system, according to an example embodiment. The three dimensional display system contains a display 202. The display 202 may be, but is not limited to, a television, cathode ray tube (CRT), flat-screen, liquid crystal display (LCD), plasma, thin film transistor (TFT), movie screen, or other device or surface capable of displaying images to a viewer. The display may also be or work in conjunction with a pair of eyeglasses, such as glasses that present an anaglyph of left and right images, where the anaglyph has left and right images presented simultaneously, where the anaglyph left image is red or blue and the right image is blue or red, respectively, where the anaglyph is compatible with red and blue lens 3-D glasses, where the anaglyph is compatible with polarized lens 3-D glasses, where the stereoscopic images are alternated in synchronization with left and right lenses of the 3-D glasses that alternate between opaque and transparent, and where the 3-D glasses utilize liquid crystal shutters. The display 202 may operate through image projection and may be of variable sizes, such as large theatre screens and handheld device screens. The display 202 may communicate with an orientation tracker 204. In an example embodiment, the orientation tracker 204 tracks and determines the orientation of a viewer's eyes 206 with regards to distance and the dimensions discussed in FIG. 1. Additionally, viewer location and velocity may also be tracked. The orientation tracker 204 may track the orientation of the viewer's eyes 206 through various means including, but not limited to, the use of a camera or other methods to determine orientation. In an example embodiment, the viewers may wear eyeglasses that may be specially marked or contain visual elements that are easily tracked or recognized by the orientation tracker 204. For example, the viewer's eyeglasses may have colored markings or LED lights, which make it easier to track. In a further embodiment, the viewer may wear, yield, or interact with specialized glasses, accessories, or devices that track and determine the orientation of the viewer's eyes 206, such as a pair of glasses with gyroscopes, and that then communicate the orientation information to the orientation tracker 204. In such an example, the orientation tracker 204 may receive the orientation of the viewer's eyes 206 rather than determine it. In an example embodiment, a remote 210 may transmit messages to control the image displayed on the display 202. The remote 210 may communicate with the three dimensional rendering device 208, the orientation tracker 204, or the display 202.

The orientation tracker 204 may communicate the orientation data with a three dimensional rendering device 208 and the display 202. The three dimensional rendering device 208 may be separate from or integrated with the orientation tracker 204 and the display 202. The three dimensional rendering device 208 may be, but is not limited to, a device which is capable of providing three dimensional video or image data to the display 202, a specialized processing device such as a media center PC, an image descrambler such as a cable box, a video playback device such as a DVD player, computer, or a dynamic image processor such as a video game console. In an example embodiment, the three dimensional rendering device 208 uses the orientation data provided by the orientation tracker 204 to adjust the roll and other dimensions of and distance between the pair of stereoscopic images to be displayed on the display 202. In another embodiment, the orientation tracker 204 communicates the orientation data to the display 202 which uses said orientation data to properly adjust the orientation of and distance between a pair of stereoscopic images rendered by the three dimensional rendering device 208.

The viewer's eyes 206 may view an image from the display 202. In an example embodiment, the image presented on the display 202 is dynamically updated to adjust to changes in the orientation of the viewer's eyes 206.

Figure 3A:
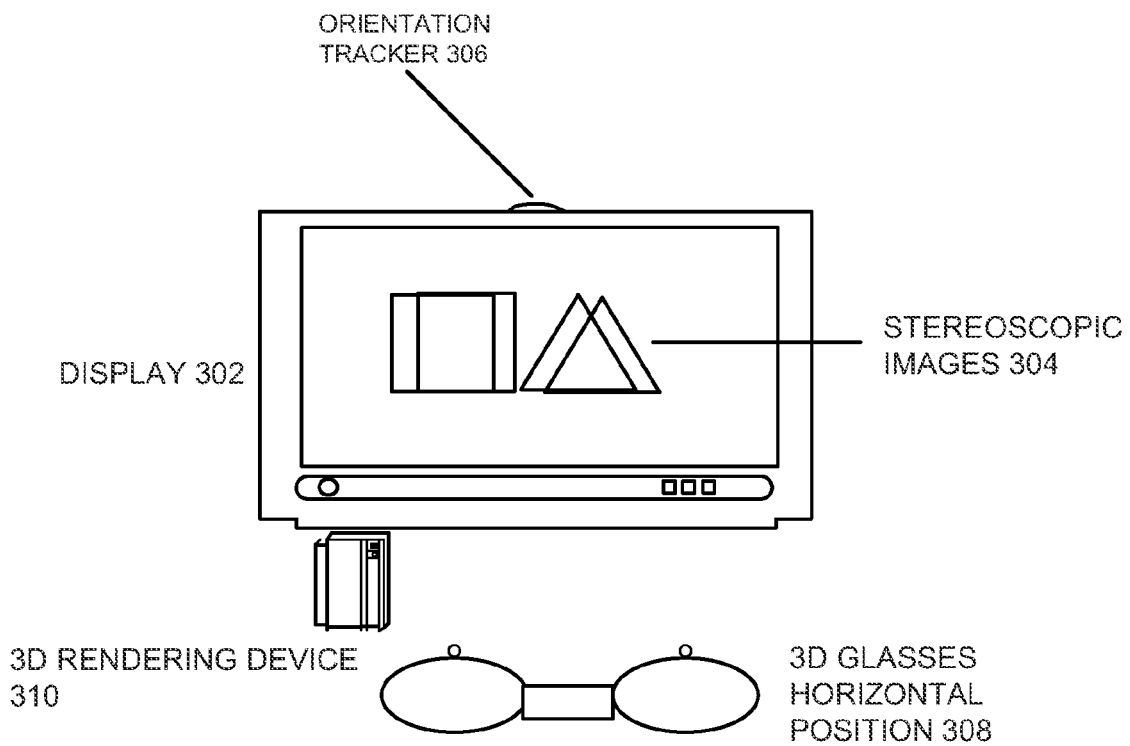
FIG. 3A is a block diagram of a three dimensional display system and a pair of stereoscopic images with 3D glasses in a horizontal position, according to an example embodiment.

FIG. 3A is a block diagram illustrating the elements of a three dimensional display system and stereoscopic images with 3D glasses in a horizontal position, according to an example embodiment. A display 302 displays a pair of stereoscopic images 304 and interacts with an orientation tracker 306 and a three dimensional rendering device 310. The orientation tracker 306 tracks the orientation of a three dimensional glasses 308. In an example embodiment, the three dimensional glasses 308 may have LEDs that the orientation tracker 306 can track to determine orientation. In this example, each eye is presented an image of a rectangle and a triangle 304. The left eye sees the rectangle and triangle pair on the left side (the viewer's left), while the right eye sees the rectangle and triangle on the right side (the viewer's right). Because the three dimensional glasses 208 are horizontally aligned with respect to the display 302, the two stereoscopic images 304 are also horizontally aligned with a horizontal distance separating the pair of stereoscopic images 304.

Figure 3B:
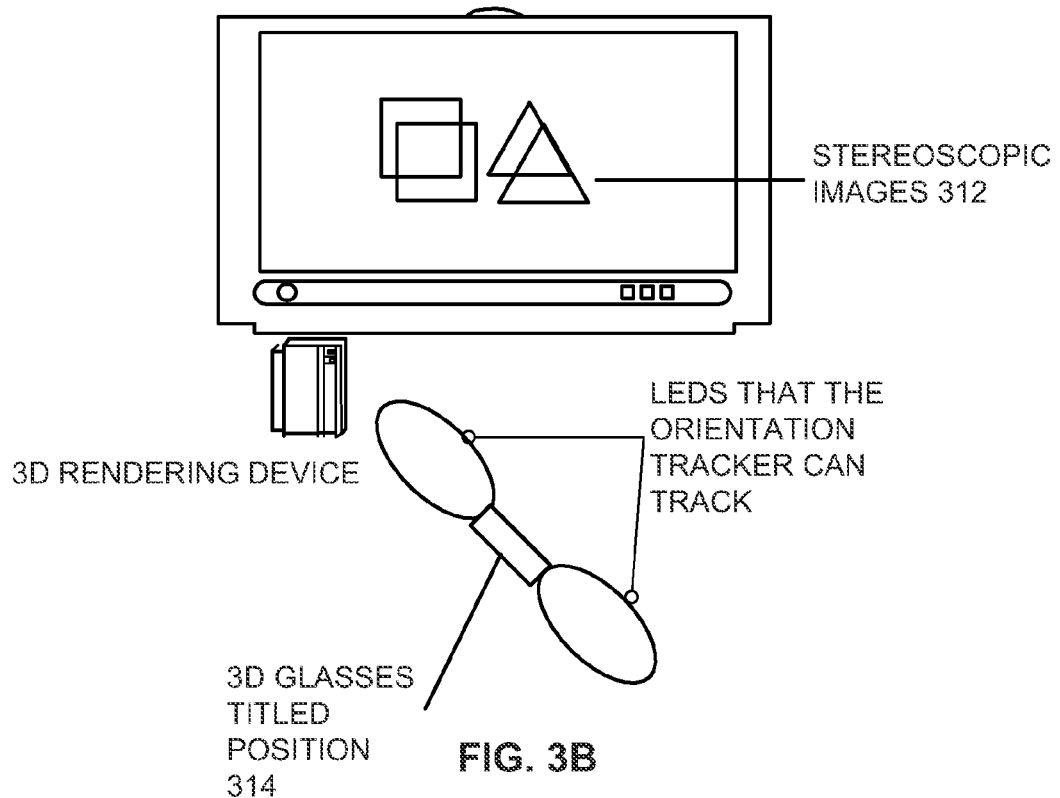
FIG. 3B is a block diagram of a three dimensional display system and a pair of stereoscopic images with 3D glasses in a rotated position, according to an example embodiment.

FIG. 3B is a block diagram illustrating the elements of a three dimensional display system and stereoscopic images with 3D glasses in a rotated position, according to an example embodiment. This block diagram contains the same elements as FIG. 3A, but in this diagram the three dimensional glasses 314 are inclined, or rotated, around the z-axis to introduce a degree of roll. To compensate for the roll inclination in the viewer's eyes, as indicated by the orientation of the three dimensional glasses 314, the pair of stereoscopic images 312 are also rotated, such that their relative position from each other in terms of x-axis and y-axis position is rotated. The rotated stereoscopic images 312 allow for the proper three dimensional effect to still be viewed by the viewer.

Figure 4A:
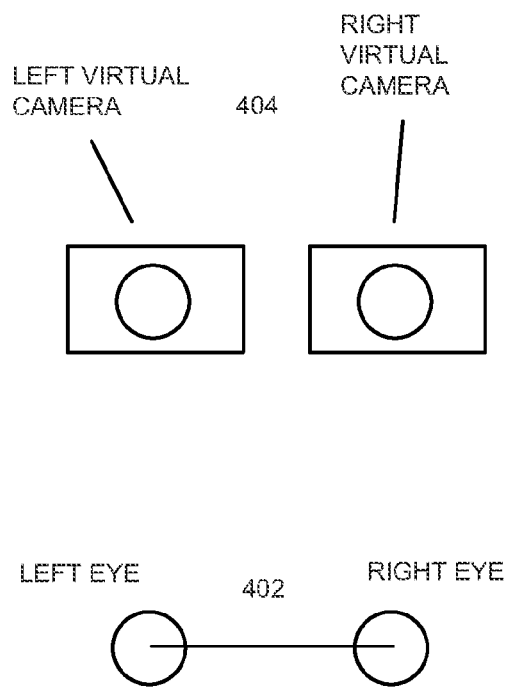
FIG. 4A is a block diagram illustrating a pair of stereoscopic images without roll, according to an example embodiment.

FIG. 4A is a block diagram illustrating the rotation of a pair of stereoscopic images to compensate for roll, according to an example embodiment. In the diagram, both left eye and right eye 402 are horizontally positioned with respect to a display that displays the left and right virtual cameras 404, which present the pair of stereoscopic images, and the viewer is directly facing the display. Because the viewer's eyes 402 are not rotated, the left and right virtual cameras 404 are therefore horizontal aligned.

Figure 4B:
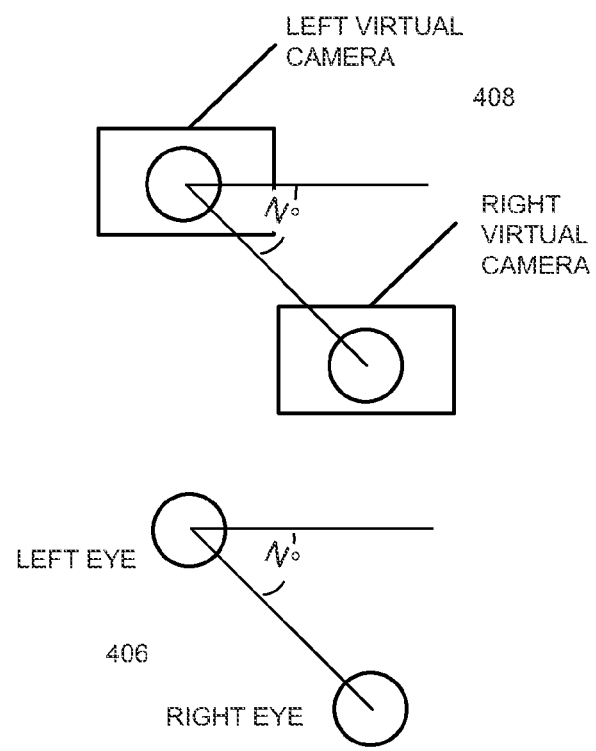
FIG. 4B is a block diagram illustrating the rotation of a pair of stereoscopic images to compensate for roll, according to an example embodiment.

FIG. 4B is a block diagram illustrating the rotation of a pair of stereoscopic images to compensate for roll, according to an example embodiment. In the diagram, the left and right eyes 406 are rotated N° along the z-axis, introducing N° of roll. To compensate, the left virtual camera and right virtual camera 408 are also rotated N°. It should be noted that the distance between the center of the left and right virtual eyes 408 remains the same when rotated by N°. In an example embodiment, if N exceeds 90° the left and right eye images 408 may be switched.

Figure 5A:
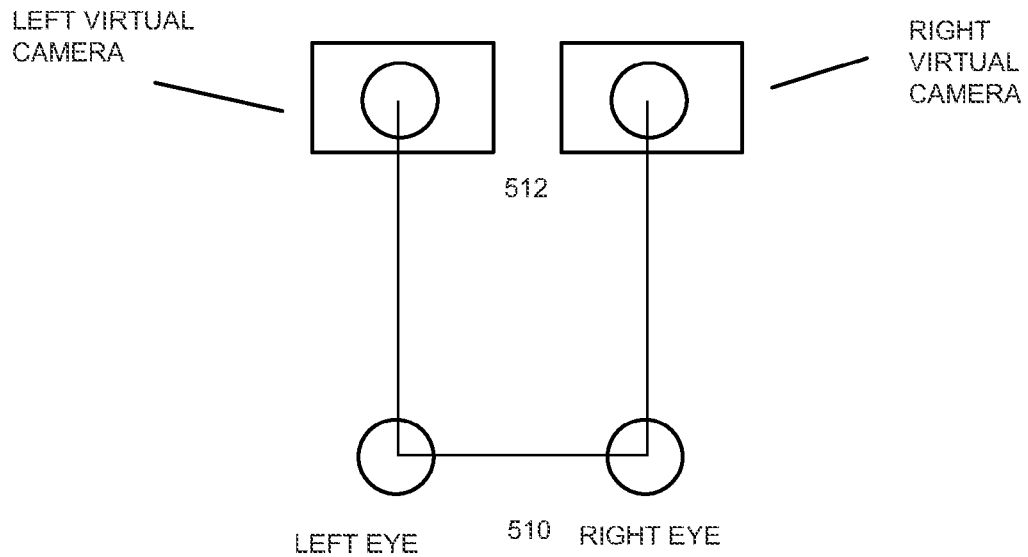
FIG. 5A is a block diagram illustrating a pair of stereoscopic images with no yaw compensation, according to an example embodiment.

FIG. 5A is a block diagram illustrating the rotation of a pair of stereoscopic images to compensate for yaw, according to an example embodiment. In the left example, both left eye and right eye 510 are equidistant from the display and no angle of yaw is introduced, with the viewer directly facing the display with no rotation. In an example embodiment, the distance between the virtual eyes 512 is the same as the distance between the left and right eye 510 of the viewer.

Figure 5B:
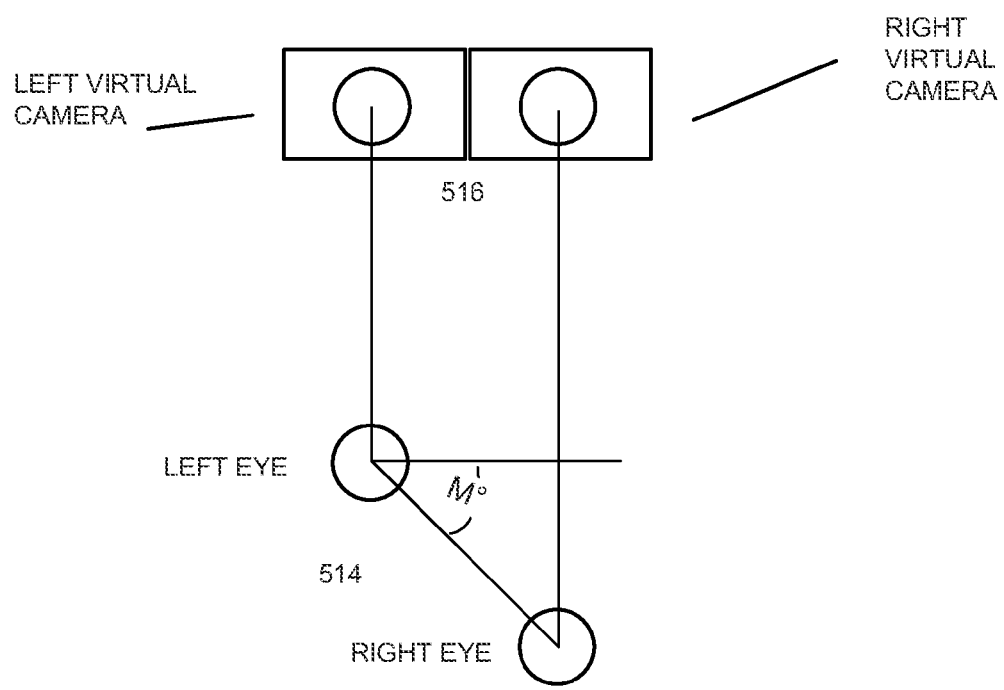
FIG. 5B is a block diagram illustrating a pair of stereoscopic images with no yaw compensation, according to an example embodiment.

FIG. 5B is a block diagram illustrating a pair of stereoscopic images with no yaw compensation, according to an example embodiment. In the diagram, the viewer rotates their eyes 514 M° along the y-axis, introducing M° of yaw. To compensate, the distance between the left and right virtual cameras 516 when there is no yaw is multiplied against the cosine of M° to move the left and right virtual cameras 516 closer together. Other methods may be used to reduce the distance between the stereoscopic images to compensate for perspective effects as yaw increases with respect to the display. In an example embodiment, the distance between the pair of stereoscopic images may be reduced proportionally to the degree of yaw.

Figure 6:
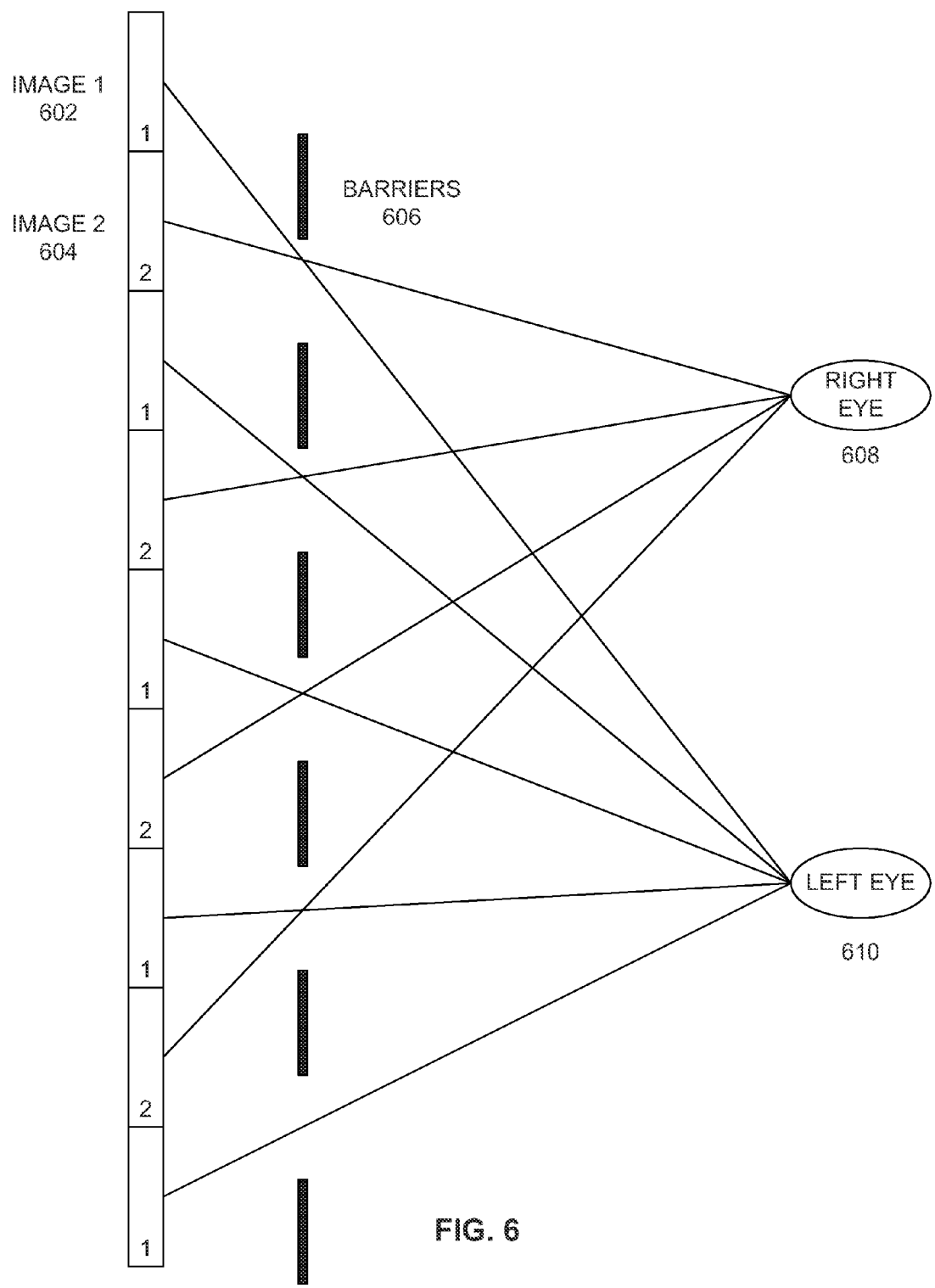
FIG. 6 is a diagram of a parallax barrier display, according to an example embodiment.

FIG. 6 is a diagram of a parallax barrier display, according to an example embodiment. Parallax barrier technology is an autostereoscopic technology that may be used to display multiple pairs of stereoscopic images to a plurality of viewers. In general, parallax barrier technology presents two images, image 1 602, and image 2 604, one for the right eye 608 and for the left eye 610 of the viewer. Each image 602, 604, may be directed to only one eye by placing vertical barriers 606 in the path of the pixels emitting the light. The number of images presented may be increased by increasing the length of the barriers 606. This allows a plurality of pairs of stereoscopic images to be presented. Moreover, the addition of a vertical barrier, to form a grid barrier, can then present a rotated three dimensional image. Thus, parallax barrier technology may allow autostereoscopic viewing of a stereoscopic image for one or more parties, and may also allow a plurality of viewers to see a plurality of stereoscopic images, where each of the plurality of viewers may see a personalized rotated image to compensate for their personal roll, yaw, or pitch, with respect to the display. The methods and systems described herein may be implemented using parallax barrier technology.

Figure 7:
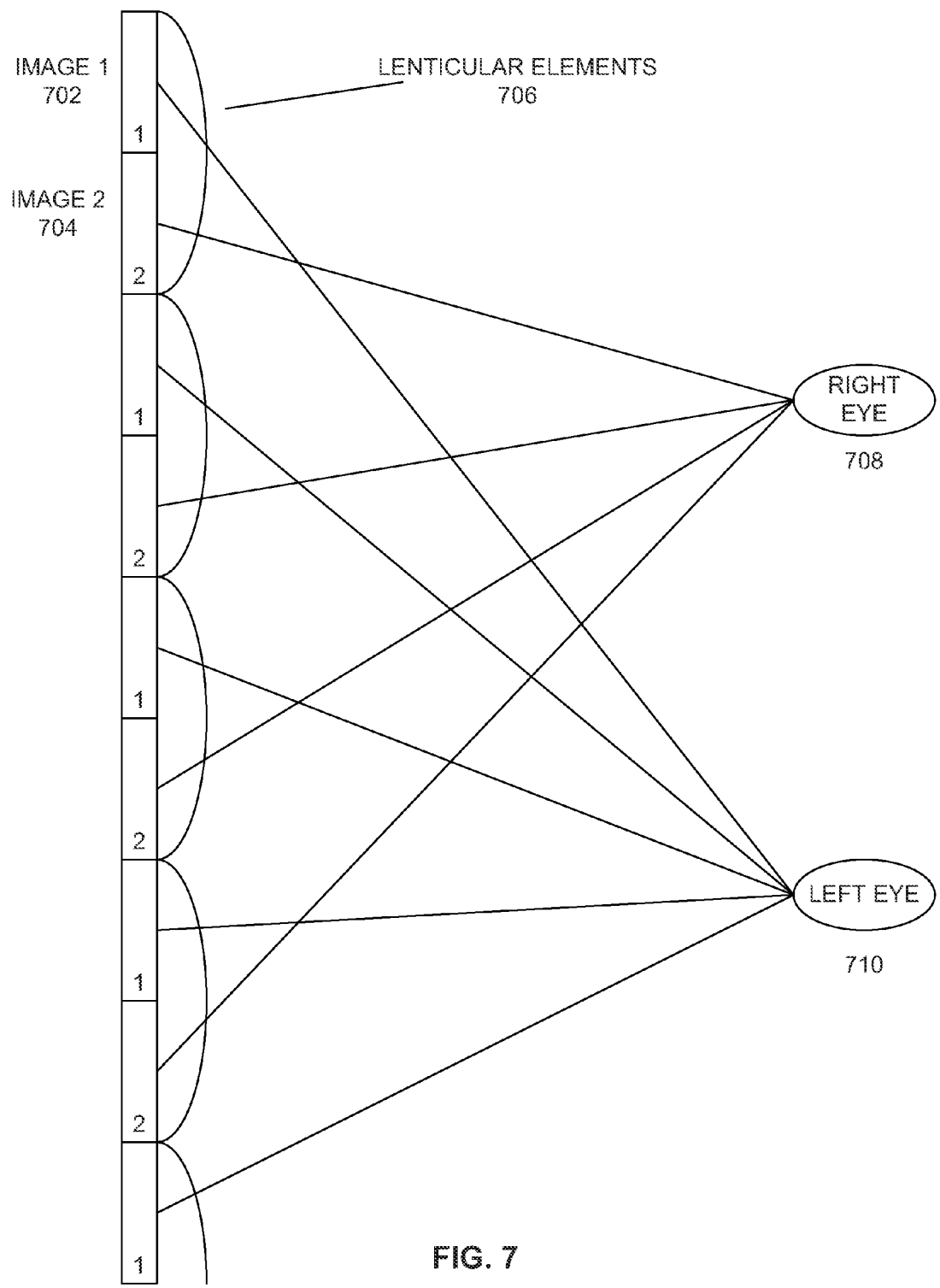
FIG. 7 is a diagram of a lenticular lens display, according to an example embodiment.

FIG. 7 is a diagram of a lenticular display, according to an example embodiment. Lenticular 3D, or the use of lenticular elements 706 is similar to that of a parallax barrier, but instead of directing stereoscopic images to each eye 708, 710 by using barriers, lenticular elements 706 are placed near light sources for images 702, 704, and the lenses direct light to the respective eyes. Similarly, increased numbers of or different shapes of lenses can display a plurality of pairs of stereoscopic images to a plurality of viewers, which can rotate to compensate for roll, pitch, and yaw in the viewer's eyes. It may also present the same stereoscopic images to a plurality of viewers. The methods and systems described herein may be implemented using lenticular technology. Other techniques, such as time multiplexing, may also be used to reach substantially the same effects. In an example embodiment, viewers of the display may wear eyeglasses that synchronize the shuttering of an eye with the display of an image, such as in time based multiplexing. For example, the eyeglasses may shutter between left and right eye thirty times a second where the shuttering between the eyes synchronizes with displays of different images on the display. In this way, two separate images may be presented to the viewer. In an example embodiment there may be multiple viewers and the shuttering may synchronize across the viewers' eyes. For example, a display may show four different images, one for each eye for two viewers, and the glasses of each viewer may only allow one eye of one viewer to see an image at one time.

Figure 8:
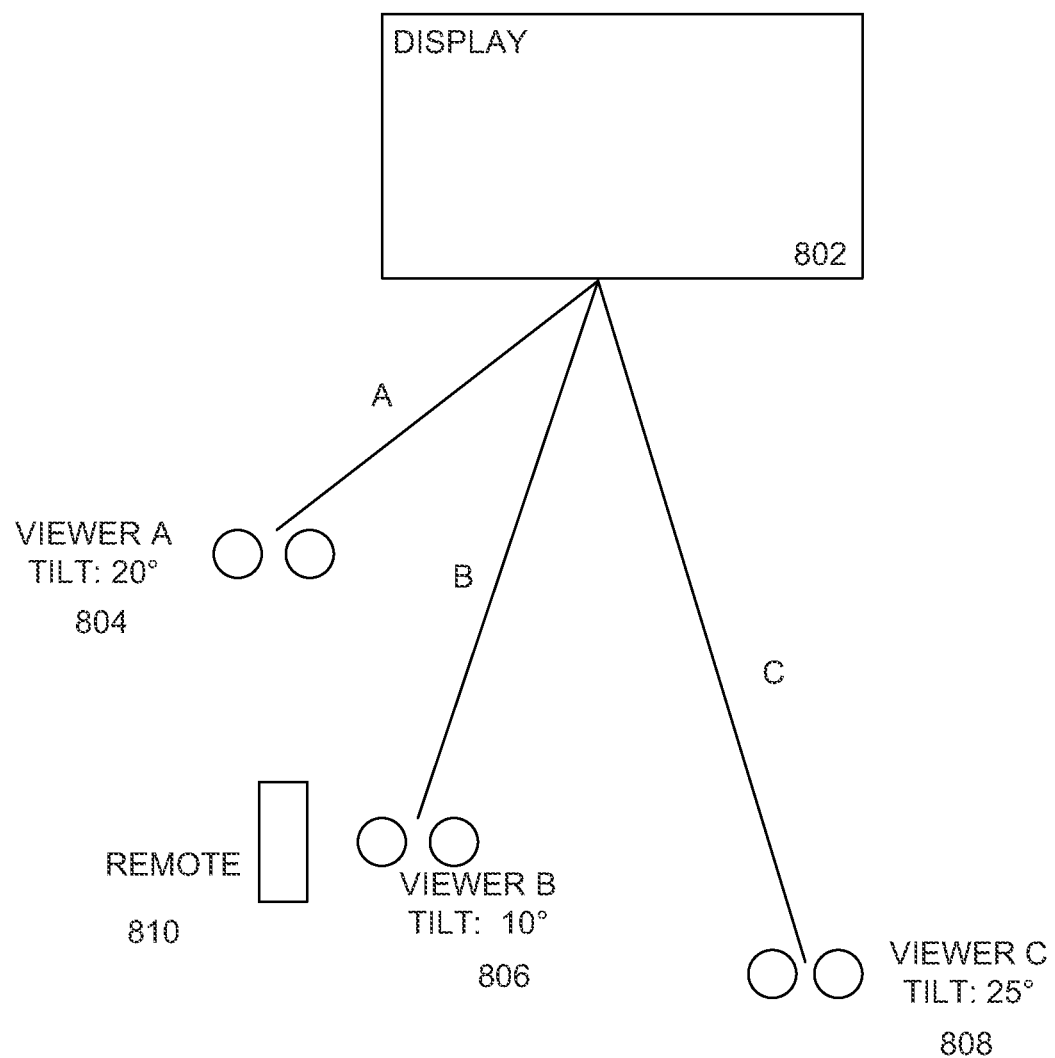
FIG. 8 is a block diagram illustrating a plurality of viewers at a plurality of roll inclinations with respect to a display, according to an example embodiment.

FIG. 8 is a block diagram illustrating a plurality of viewers at a plurality of roll inclinations with respect to a display, according to an example embodiment. The display 802 may display one pair of stereoscopic images to all viewers or it may direct a personalized pair of stereoscopic images to each of a plurality of viewers. In an example embodiment, the display 802 may display a two dimensional image to a subset of viewers while also displaying one or more pairs of stereoscopic images to another subset of viewers.

In the case that the display 802 displays one pair of stereoscopic images to the plurality of viewers, each viewer with a potentially different roll inclination respective to the display 802, then the roll adjustment must be determined. In one embodiment, the roll adjustment of the pair of stereoscopic images may be substantially equal to the average roll inclination of the viewers. For example, if viewer A (804), B (806), and C (808) have a roll inclination of 20°, 10°, and 25° respectively then the display 802 can display the pair of stereoscopic images at a roll inclination of 18.33° In another embodiment, the display 802 may display the roll inclination equal to the roll inclination of the closest viewer, in this case, displaying the pair of stereoscopic images at a roll of 20°, because viewer A 804 is the closest. In another embodiment, the roll inclination may be determined by a weighted average of the viewer's roll inclinations, with a greater weight given to the viewers closer to the display 802. Thus, in this example the roll of 20° would be given a greater weight than the roll of 10°, because viewer A 804 is closer than viewer B 806. In a further embodiment, the user closest to a remote 810 may dictate the roll inclination of the pair of stereoscopic images. For example, if viewer B 806 holds the remote 810, or is the closest to the remote 810, then his roll inclination will be used by the display 802, so that images on the display will be rotated by 10°. The roll inclination of the stereoscopic images may also be determined by a weighted average that gives more weight to the roll inclinations of viewers who are closer to the remote 810. For example, the roll inclinations of viewer B 806 and viewer A 804 would be given more weight than the roll of viewer C 808. In an example embodiment, the roll inclination may be determined by the mode roll inclination. For example, if more people are rotated at 20° than any other degree, the stereoscopic images will be similarly rotated by 20°. In a further embodiment, the roll inclination of the stereoscopic images may be determined by a weighted average that gives more weight to the roll inclinations of viewers who are closer to the optimal location for viewing three dimensional content displayed by a parallax barrier. For example, a parallax barrier may provide the best three dimensional viewing experience in one or more locations, such as directly in front of the display and six feet back. The closer a viewer is to that optimal location, the greater weight their roll is given. In an example embodiment, the display 802 and supporting devices may determine that no single roll inclination would suffice for the viewers and provide a two dimensional image to all the viewers. The methods and embodiments above can also be utilized to provide a pair of stereoscopic images at a roll inclination for only a subset of the viewers, while potentially displaying a two dimensional image to the remaining subset of the viewers. For example, it may be determined that a pair of stereoscopic images with a roll inclination of 22.5° can be displayed to viewer A 804 and viewer C 808 while viewer B 806 is presented a two dimensional image. The methods listed above for determining the roll inclination of a pair of stereoscopic images from the roll inclination of a plurality of viewers may also be applied to yaw or other calculations.

Some systems may be able to render a plurality of pairs of stereoscopic images and display them to plurality of viewers. However, due to processing or display limitations, the above techniques to determine a roll inclination shared between viewers may also be utilized for said systems. Such systems may also only present three dimensional images to subset of their viewers.

Figure 9:
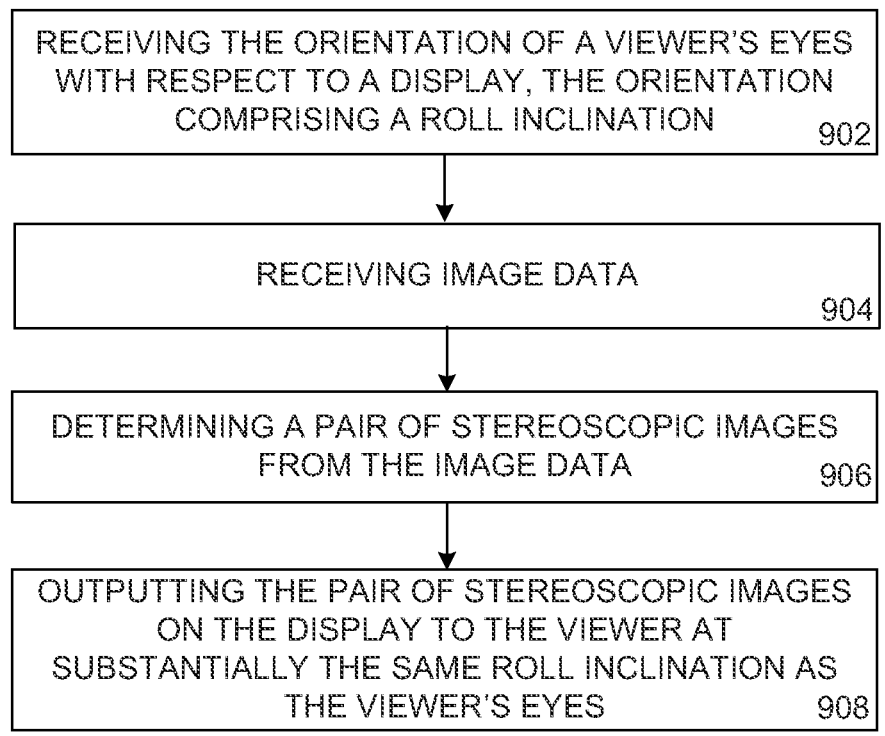
FIG. 9 is process flow of rotating a pair of stereoscopic images according to the roll inclination of a viewer's eyes, according to an example embodiment.

FIG. 9 is process flow of rotating a pair of stereoscopic images according to a viewer's roll inclination, according to an example embodiment. At operation 902, the orientation of a viewer's eyes with respect to a display is received. This orientation data comprising a roll inclination. In an example embodiment, the orientation data may be tracked through visual, radio, or other sensory input. A video or image camera, motion detectors, or other sensors may be used to track a viewer's location and orientation. A viewer may wear eyeglasses with LED lights or special markings for easier tracking. In an example embodiment, software packages may support the orientation tracking process. For example, software may be able to recognize faces and features, such as eyes. Three dimensional modeling may be utilized in conjunction with sensor data to simulate the location and movement of a viewer's head and eyes. In another embodiment, the orientation of the user's eyes is specifically tracked. For example, a viewer may wear eyeglasses that contain gyroscopes or may communicate with an orientation tracker directly to determine orientation. Devices other than eyeglasses may also be used to track viewer orientation.

After receiving the orientation of a viewer's eyes with respect to a display, at operation 904 image data is received. This image data may represent images or video. In an example embodiment, the data may be in the form of, but is not limited to, a digital video disc (DVD), digital image signals, such as video graphics array (VGA), high definition video, red green blue (RGB) data, broadcast television, or video game data. In an example embodiment, the image data may be later rolled or adjusted, such as with pre-recorded movie data. In another embodiment, the image data is dynamic data, and may be the result of an interactive system, such as a video game console, where the image data may already be adjusted to the roll or rotation of the viewer's eyes. At operation 906, the a pair of stereoscopic images is rendered from the image data. The data may be used to determine three dimensional images and movies. At operation 908, the pair of stereoscopic images is outputted at substantially the same roll inclination as the viewer's eyes. The display of the pair of stereoscopic images at the same roll as the viewer's eyes preserves the three dimensional effect when roll exists. If the viewer's eyes are not orientated with any degree of roll, then the pair of stereoscopic images will also be outputted without roll.

"Substantially" the same roll inclination includes angles within 1°, 5°, 10°, 15° or more of each other.

Figure 10:
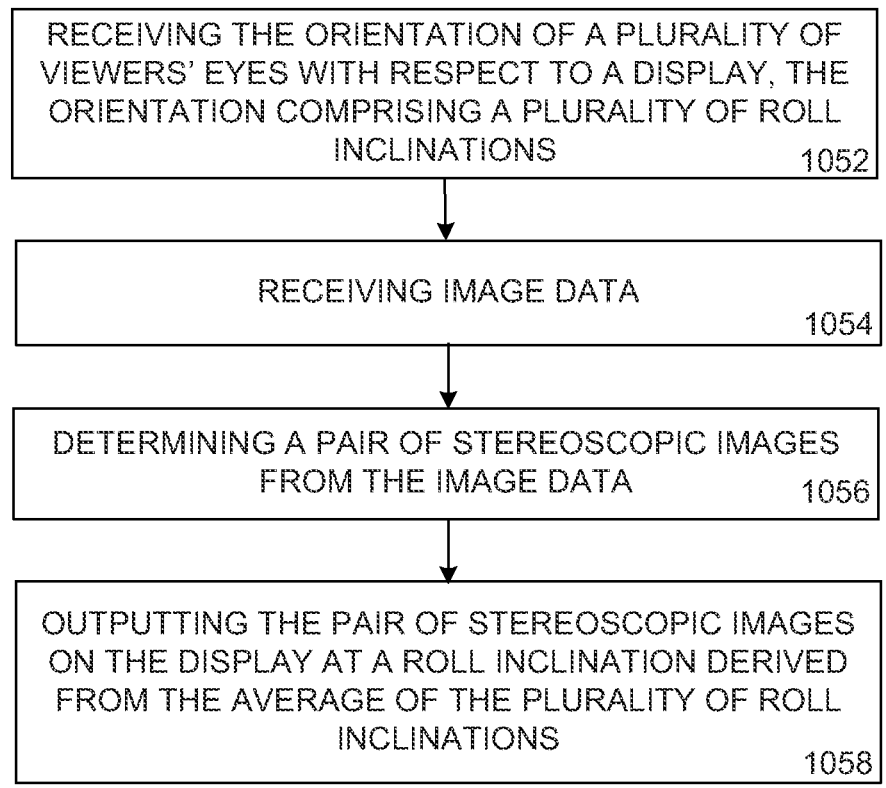
FIG. 10 is a process flow of rotating a pair of stereoscopic images according to the average roll inclination of a plurality of viewers, according to an example embodiment.

FIG. 10 is a process flow of rotating a pair of stereoscopic images according to the roll inclination of a plurality of viewers, according to an example embodiment. At operation 1052 the orientation of a plurality of viewers' eyes with respect to a display, the orientation comprising a plurality of roll inclinations, is received. The viewers' eye orientations may be tracked in various ways, such as described in FIG. 9. Next, at operation 1054, image data is received. In an example embodiment, the image data may be later rolled or adjusted, such as with pre-recorded movie data. In another embodiment, the image data is dynamic data, and may be the result of an interactive system, such as a video game console, where the image data may already be adjusted to the roll or rotation of the viewer's eyes. At operation 1056, a pair of stereoscopic images are determined from the received image data. At operation 1058, the pair of stereoscopic images are outputted at a roll inclination derived from the average of the plurality of roll inclinations.

Figure 11:
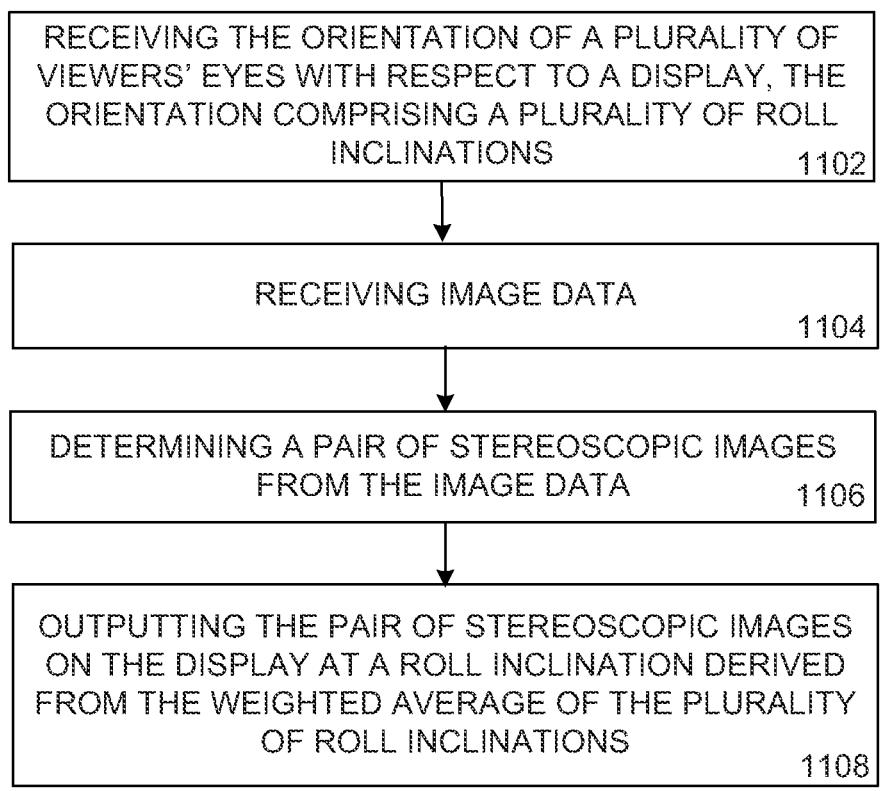
FIG. 11 is process flow of rotating a pair of stereoscopic images according to the weighted average of the viewers' roll inclination, according to an example embodiment.

FIG. 11 is process flow of rotating a pair of stereoscopic images according to the weighted average roll inclination of a viewers' eyes, according to an example embodiment. At operation 1102 the orientation of a plurality of viewers' eyes with respect to a display, the orientation comprising a plurality of roll inclinations, is received. The viewers' eye orientations may be tracked in various ways, such as described in FIG. 9. Next, at operation 1104, image data is received. In an example embodiment, the image data may be later rolled or adjusted, such as with pre-recorded movie data. In another embodiment, the image data is dynamic data, and may be the result of an interactive system, such as a video game console, where the image data may already be adjusted to the roll or rotation of the viewer's eyes. At operation 1106, a pair of stereoscopic images are determined from the received image data. At operation 1108, the pair of stereoscopic images are outputted at a roll inclination derived from a weighted average of the plurality of roll inclinations. In one embodiment, greater weight is assigned to roll inclinations for viewers that are closer to the display. In another embodiment, greater weight is assigned to roll inclination for viewers that are closer to the remote. Other functions to assign weights to the average may be applied.

Figure 12:
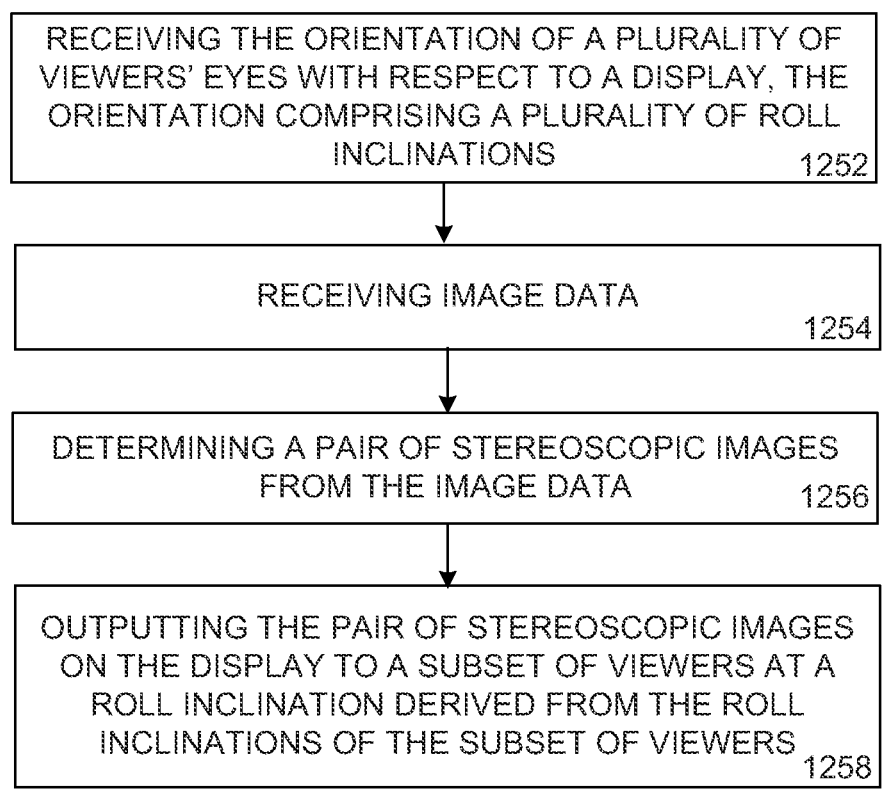
FIG. 12 is a process flow of rotating a pair of stereoscopic images according to the roll inclination of a subset of viewers, according to an example embodiment.

FIG. 12 is a process flow of rotating a pair of stereoscopic images according to the roll inclination of a subset of viewers, according to an example embodiment. At operation 1252 the orientation of a plurality of viewers' eyes with respect to a display, the orientation comprising a plurality of roll inclinations, is received. The viewers' eye orientations may be tracked in various ways, such as described in FIG. 9. Next, at operation 1254, image data is received. In an example embodiment, the image data may be later rolled or adjusted, such as with pre-recorded movie data. In another embodiment, the image data is dynamic data, and may be the result of an interactive system, such as a video game console, where the image data may already be adjusted to the roll or rotation of the viewer's eyes. At operation 1256, a pair of stereoscopic images are determined from the received image data. At operation 1258, the pair of stereoscopic images are outputted at a roll inclination derived from the roll inclinations from that subset.

Figure 13:
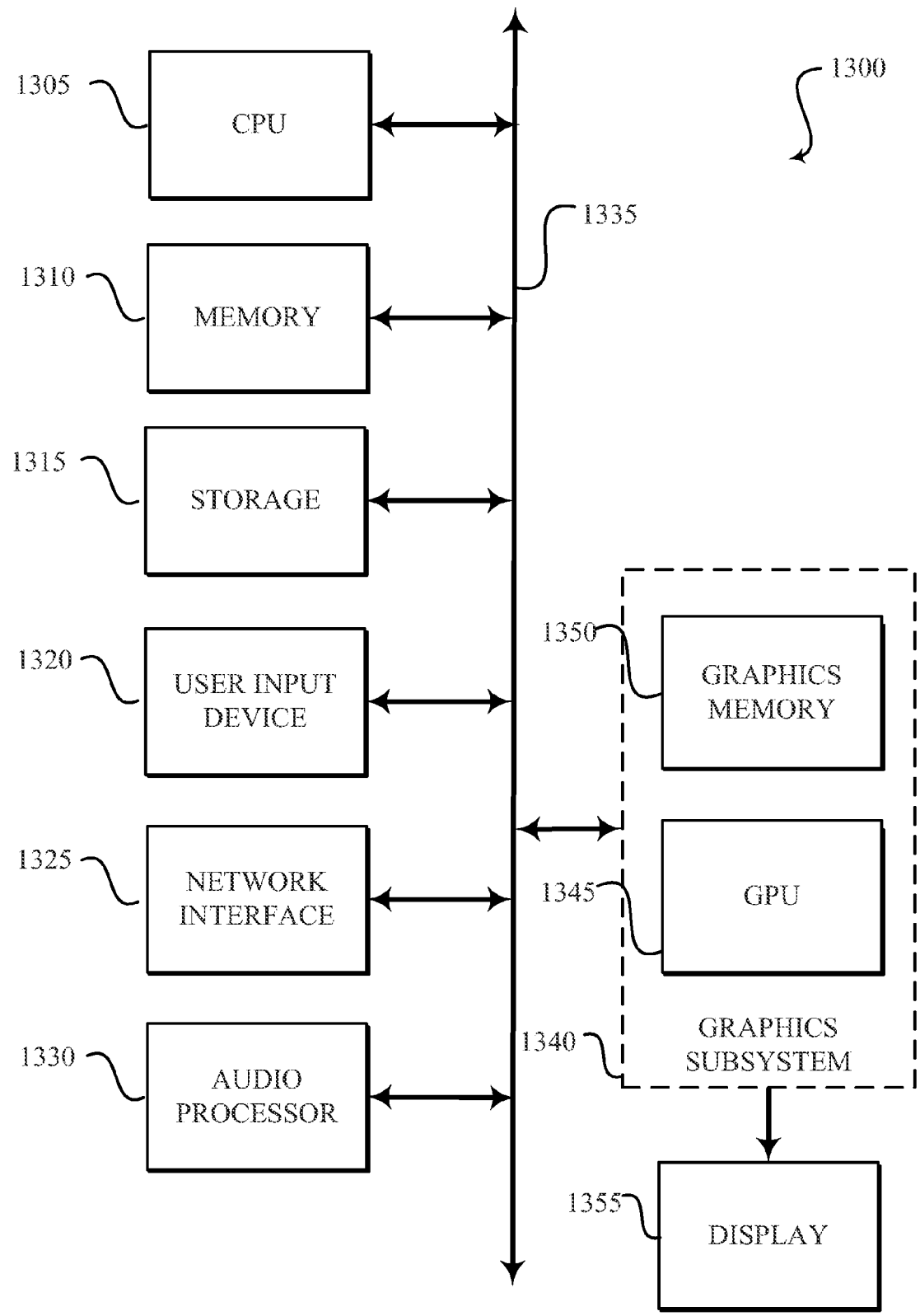
FIG. 13 is an example computer system suitable for use with embodiments of the invention.

FIG. 13 is an example computer system suitable for use with embodiments of the invention. This block diagram illustrates a computer system 1300, such as a personal computer, video game console and associated display (e.g., three dimensional rendering device 208 and orientation tracker 204 of FIG. 2), personal digital assistant, or other digital device, suitable for practicing embodiments of the invention. Computer system 1300 includes a central processing unit (CPU) 1305 for running software applications and optionally an operating system. CPU 1305 may be made up of one or more homogeneous or heterogeneous processing cores. Memory 1310 stores applications and data for use by the CPU 1305. Storage 1315 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1320 communicate user inputs from one or more users to the computer system 1300, examples of which may include keyboards, mice, joysticks, touch pads, touch screens, still or video cameras, and/or microphones. Network interface 1325 allows computer system 1300 to communicate with other computer systems via an electronic communications network, and may include wired or wireless communication over local area networks and wide area networks such as the Internet. An audio processor 1330 is adapted to generate analog or digital audio output from instructions and/or data provided by the CPU 1305, memory 1310, and/or storage 1315. The components of computer system 1300, including CPU 1305, memory 1310, data storage 1315, user input devices 1320, network interface 1325, and audio processor 1330 are connected via one or more data buses 1335.

A graphics subsystem 1340 is further connected with data bus 1335 and the components of the computer system 1300. The graphics subsystem 1340 includes a graphics processing unit (GPU) 1345 and graphics memory 1350. Graphics memory 1350 includes a display memory (e.g., a frame buffer) used for storing pixel data for each pixel of an output image. Graphics memory 1350 can be integrated in the same device as GPU 1345, connected as a separate device with GPU 1345, and/or implemented within memory 1310. Pixel data can be provided to graphics memory 1350 directly from the CPU 1305. Alternatively, CPU 1305 provides the GPU 1345 with data and/or instructions defining the desired output images, from which the GPU 1345 generates the pixel data of one or more output images. The data and/or instructions defining the desired output images can be stored in memory 1310 and/or graphics memory 1350. In an embodiment, the GPU 1345 includes 3D rendering capabilities for generating pixel data for output images from instructions and data defining the geometry, lighting, shading, texturing, motion, and/or camera parameters for a scene. The GPU 1345 can further include one or more programmable execution units capable of executing shader programs.

The graphics subsystem 1340 periodically outputs pixel data for an image from graphics memory 1350 to be displayed on display device 1355. Display device 1355 can be any device capable of displaying visual information in response to a signal from the computer system 1300, including CRT, LCD, plasma, and OLED displays. Computer system 1300 can provide the display device 1355 with an analog or digital signal.

In accordance with various embodiments, CPU 1305 is one or more general-purpose microprocessors having one or more processing cores. Further embodiments can be implemented using one or more CPUs with microprocessor architectures specifically adapted for highly parallel and computationally intensive applications, such as media and interactive entertainment applications.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of displaying a three dimensional image comprising:
   receiving an orientation of a viewer's eyes with respect to a display, the orientation comprising a viewer's roll inclination and a viewer's yaw inclination;
   receiving image data;
   determining a pair of stereoscopic images from the image data;
   adjusting a distance between the pair of stereoscopic images for the viewer's yaw inclination with respect to the display; and
   outputting the pair of stereoscopic images on the display, the distance between the pair of stereoscopic images multiplied by the cosine of the yaw inclination of the viewer's eyes with respect to the display, the pair of stereoscopic images at substantially the same roll inclination as the viewer's roll inclination.

2. The method of claim 1 wherein the pair of stereoscopic images is displayed at the same roll inclination as the viewer's eyes with respect to the display.

3. The method of claim 1 wherein the pair of stereoscopic images are alternated in synchronization with left and right lenses of three dimensional glasses that alternate between opaque and transparent.

4. The method of claim 1 wherein the pair of stereoscopic images is an anaglyph compatible with glasses of different colored lenses.

5. The method of claim 1 wherein the pair of stereoscopic images is an anaglyph compatible with polarized lens glasses.

6. The method of claim 1 wherein a parallax barrier is used to present the pair of stereoscopic images to the viewer.

7. The method of claim 1 wherein lenticular elements are used to present the pair of stereoscopic images to the viewer.

8. A method of displaying a three dimensional image comprising:
   receiving orientation data on a plurality of viewers' eyes with respect to a display, the orientation data comprising viewers' roll inclinations and yaw inclinations;
   receiving image data;
   determining a pair of stereoscopic images from the image data;
   deriving a display roll inclination based on the orientation data of the plurality of viewers' eyes with respect to the display;
   deriving a display yaw inclination based on the orientation data of the plurality of viewers' eyes with respect to the display;
   adjusting a distance between the pair of stereoscopic images for the derived display yaw inclination; and
   outputting the pair of stereoscopic images on the display based on the derived display roll inclination, wherein the distance between the pair of stereoscopic images is multiplied by the cosine of the derived display yaw inclination.

9. The method of claim 8 wherein the display roll inclination is derived from an average of the viewers' roll inclinations.

10. The method of claim 8 wherein the display roll inclination is derived from a weighted average of the viewers' roll inclinations with a greater weight given for a viewer closer to the display.

11. The method of claim 8 wherein the display roll inclination is derived from a weighted average of the viewers' roll inclinations with a greater weight given for viewers closer to a remote control device that controls the display.

12. The method of claim 8 wherein the display roll inclination is derived from a subset of the viewers' roll inclinations and the pair of stereoscopic images is displayed to the viewers associated with the subset of the viewers' roll inclinations.

13. The method of claim 12 wherein only the viewer with the remote is displayed a stereoscopic image.

14. The method of claim 8 wherein a parallax barrier is used to present the pair of stereoscopic images to the plurality of viewers.

15. The method of claim 8 wherein lenticular elements are used to present the pair of stereoscopic images to the plurality of viewers.

16. The method of claim 8 wherein time multiplexing is used to present the pair of stereoscopic images to the plurality of viewers.

17. The method of claim 14 wherein a parallax barrier grid is used to present the stereoscopic image to a plurality of viewers at a plurality of roll inclinations.

18. The method of claim 16 wherein time multiplexing is used to present the stereoscopic image to a plurality of viewers at a plurality of roll inclinations.

19. A method of displaying a three dimensional image comprising:
   receiving an orientation of a viewer's eyes with respect to a display, the orientation comprising a viewer's yaw inclination;
   receiving image data;
   determining a pair of stereoscopic images from the image data; and
   outputting the pair of stereoscopic images on the display so the distance between the pair of stereoscopic images is multiplied by the cosine of the yaw inclination, thereby compensating for the yaw inclination of the viewer's eyes with respect to the display.

20. A system of displaying three dimensional images comprising:
   an orientation tracker for receiving an orientation of a viewer's eyes with respect to a display, the orientation comprising a viewer's roll inclination and a viewer's yaw inclination;
   means for receiving image data;
   a three dimensional rendering device to render a pair of stereoscopic images from the image data; and
   means for adjusting a distance between the pair of stereoscopic images for the viewer's yaw inclination with respect to the display; and
   a display to display the pair of stereoscopic images, the distance between the pair of stereoscopic images multiplied by the cosine of the yaw inclination of the viewer's eyes with respect to the display, the pair of stereoscopic images at substantially the same roll inclination as the viewer's roll inclination.

21. The system of claim 20 wherein the display comprises lenticular elements.

22. The system of claim 20 wherein the display utilizes time multiplexing.

23. The method of claim 1 wherein an orientation tracker is used to receive the orientation of the viewer's eyes with respect to the display by tracking a pair of marked eyeglasses worn by the viewer.

24. The method of claim 15 wherein lenticular elements are used to present the stereoscopic image to a plurality of viewers at a plurality of pitch inclinations.

25. The method of claim 1 wherein an orientation tracker is used to receive the orientation of the viewer's eyes with respect to the display by tracking a pair of eyeglasses including a gyroscope worn by the viewer.

26. The method of claim 3 wherein the three dimensional glasses comprise liquid crystal shutters.

27. The method of claim 8 wherein the display roll inclination is derived from a mode roll inclination of the viewers' roll inclinations.

\* \* \* \* \*